Dec. 6, 1932.    O. C. GEHRMAN    1,889,828
SPLIT JOINT RING
Filed March 6, 1930

Inventor
OTTO C. GEHRMAN
By Edgar M Kitchin
his Attorney.

Patented Dec. 6, 1932

1,889,828

UNITED STATES PATENT OFFICE

OTTO C. GEHRMAN, OF OMAHA, NEBRASKA, ASSIGNOR TO PAXTON-MITCHELL COMPANY, OF OMAHA, NEBRASKA, A CORPORATION OF NEBRASKA

SPLIT JOINT RING

Application filed March 6, 1930. Serial No. 433,693.

It has heretofore been common to provide a cross-cut ring for enabling the sections of the ring to be applied directly to a piston in a piston packing assemblage and to retain the parts of the ring in operative position by various forms of elastic connectors, one of such connectors heretofore in popular use consisting of an annular coiled spring. However, when subjected to the extreme heat generated by the modern superheated locomotives, such springs have a tendency to lose their temper and thus impair their efficiency in retaining the parts of the ring together.

The primary object of the present invention is the effective preservation of the ring assemblage despite the intense heat of the modern superheated locomotive.

A further object is the constructing of the metal packing parts such that loss of temper will not destroy capacity to operate.

With these and further objects in view as will in part hereinafter become apparent and in part be stated, the invention includes a retainer for metallic ring sections designed to withstand high temperatures and remain efficient in operation, and to constantly hold the ring sections in close contact.

The invention further includes in greater detail a ring section retainer of sufficient cross sectional proportions as to resist temper loss.

In still greater detail, the invention includes the provision of a yoke-shaped clip and substantially radially-disposed recesses in the ring sections designed to receive the legs of the clip for retaining the ring sections in operative relation.

The invention still further comprises certain other novel constructions, combinations, and arrangements of parts as subsequently specified and claimed.

In the accompanying drawing,—

Figure 1:
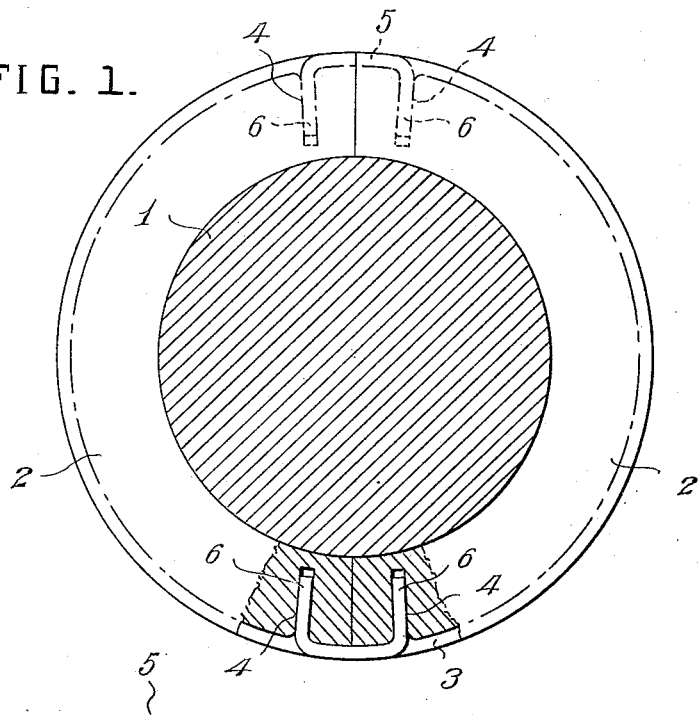
Figure 1 is a cross section through a piston rod having applied thereto an embodiment of the present invention seen in elevation, a fragment being broken away for showing interior structure.
Figure 2:
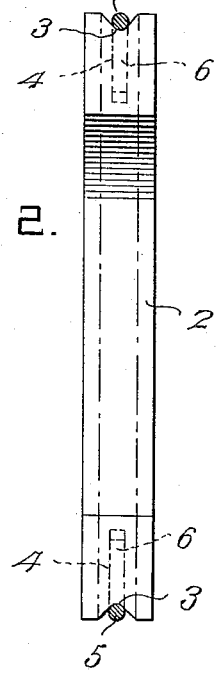
Figure 2 is an edge view of one section of the ring, the retaining clips being seen in cross section.
Figure 3:
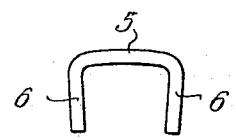
Figure 3 is a side elevation.
Figure 4:
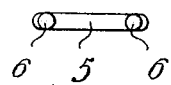
Figure 4 is an edge view of one of the retaining clips.

In piston packing assemblages of metallic packing construction, as is well known to those familiar with the art, it is usual to employ rings which, for facility of application to and removal from the piston rod, are cross-cut and thereby reduced to at least two segments.

Referring to the drawings by numerals, 1 indicates the ordinary piston rod surrounded by the split, metal joint ring 2 having the peripheral groove 3. Heretofore the ring 2 has been provided with the groove 3 extending about the entire periphery of the ring to accommodate a retaining coiled spring. According to the present invention, the coiled spring is omitted, but the groove 3 is retained as a matter of manufacturing expediency.

Adjacent each end portion of each segment of ring 2, the respective segment is provided with a recess, socket, or drilled hole 4. The several recesses or sockets 4 are substantially but not quite radial, and each inclines slightly toward the end of the respective ring segment as it extends inward, so that, when the ring segments are assembled to form a ring, adjacent sockets or recesses 4 converge slightly inward or toward the piston 1.

For each pair of recesses or sockets 4 a clip is provided consisting of a cross bar 5 and converging legs 6, 6. The clip is preferably formed of round, that is cylindrical, wire. The bar 5 is a measured length to correspond with the distance between adjacent recesses 4 at their open ends, and the convergence of the legs 6 corresponds with the convergence of the recesses 4. Each clip consisting of bar 5 and legs 6 is preferably made of an appropriate heat-resisting steel alloy, so that they possess spring resiliency which will not be lost even under the usual high temperatures of superheated locomotives. However, since the cross bar 5 in each instance is of the exact length for bridging the distance from the recess 4 of one ring segment to the recess 4 of the other ring segment, and the bar in use rests against the periphery of the ring segments, any stress or tendency toward separation of the ring segments is resisted directly by the bar 5 to which the stress is delivered as a practically straight pull. There is no resilient resistance offered by bar 5 to such stress, and loss of temper in bar 5 will, therefore, not destroy its capacity to function. It is true that the legs 6 are of resilient material and must be sprung into place, because the recesses 4 are farther apart at their outer ends than at their inner ends. This construction, however, is an expediency designed to prevent accidental loss or dislodgment of the clip and is not depended upon as the direct means of retaining the ring segments in place. It will be observed also that the gauge of wire or rod from which bar 5 and its legs 6 are formed is very substantially greater than any possible gauge of wire from which a coiled spring could be made which would lie within the groove 3, so that a temperature adequate to destroy the temper in such a coiled spring would have little or no effect on the present improved clip. The end faces of the segments 2 are thus held in intimate contact at all times by the location of the bar 5 and the engagement of leg 6 with the parts of the segments.

The recesses 4 are dimensioned to allow ready insertion and withdrawal while snugly receiving the legs 6, so that there will be no play between the said legs and the walls of said recesses, and thus the parts would effectively function even though the clips lost all their temper, but the clips function better when possessed of spring temper and likelihood of loss of temper is materially diminished by the relatively thick cross section of the material making up the clips. The groove 3 is preferably of a depth sufficient to accommodate the bar 5 without exposure of the bar beyond the periphery of the ring, so as to insure effective clearance in the complete assemblage. It will be understood, of course, that the side faces of the ring made up of segments 2 are ground or otherwise appropriately finished to provide steam-tight contact with adjacent parts.

What is claimed is:—

In metallic piston packing construction, the combination of metal ring segments each having a socket adjacent each end disposed substantially radially but slightly inclined toward the respective adjacent end so that when two ring segments are brought into end contact the adjacent sockets converge slightly inward, and substantially U-shaped spring clips engaging said sockets for detachably connecting the segments, the legs of each clip converging corresponding to the direction of the sockets and the cross bar of each clip connecting the legs being relatively thick and dimensioned to be equal in length only to the distance between outer ends of adjacent sockets for enabling the clips to retain the ring segments in contact under direct resistance to separation thereof by the bars of the respective clips.

In testimony whereof I affix my signature.

OTTO C. GEHRMAN.